(12) United States Patent
Riedel et al.

(10) Patent No.: US 10,669,027 B2
(45) Date of Patent: Jun. 2, 2020

(54) CABIN MANAGEMENT SYSTEM, AIRCRAFT OR SPACECRAFT HAVING A CABIN MANAGEMENT SYSTEM, AND METHOD

(75) Inventors: Christian Riedel, Bliedersdorf (DE); Sven-Olaf Berkhahn, Ohlendorf (DE)

(73) Assignee: Airbus Operations GmbH, Hamburg (DE)

( * ) Notice: Subject to any disclaimer, the term of this patent is extended or adjusted under 35 U.S.C. 154(b) by 657 days.

(21) Appl. No.: 13/437,431

(22) Filed: Apr. 2, 2012

(65) Prior Publication Data

US 2012/0254923 A1 Oct. 4, 2012

Related U.S. Application Data

(63) Continuation of application No. PCT/EP2010/064530, filed on Sep. 30, 2010.

(60) Provisional application No. 61/249,377, filed on Oct. 7, 2009.

(30) Foreign Application Priority Data

Oct. 7, 2009 (DE) .................. 10 2009 045 462

(51) Int. Cl.
| | |
|---|---|
| *B64D 11/00* | (2006.01) |
| *H04L 12/46* | (2006.01) |
| *H04N 7/18* | (2006.01) |
| *H04L 29/08* | (2006.01) |
| *H04N 21/214* | (2011.01) |
| *H04L 12/40* | (2006.01) |

(52) U.S. Cl.
CPC ...... *B64D 11/0015* (2013.01); *H04L 12/4616* (2013.01); *H04L 67/12* (2013.01); *H04N 7/183* (2013.01); *H04N 21/2146* (2013.01); *H04L 2012/4028* (2013.01); *Y02T 50/46* (2013.01)

(58) Field of Classification Search
CPC .................................................. H04N 21/2146
USPC .................................................. 725/76–77
See application file for complete search history.

(56) References Cited

U.S. PATENT DOCUMENTS

| | | | | |
|---|---|---|---|---|
| 6,463,468 | B1* | 10/2002 | Buch ...................... | G06Q 30/02 709/217 |
| 6,813,777 | B1* | 11/2004 | Weinberger ........ | H04B 7/18508 348/E5.008 |
| 8,424,045 | B2* | 4/2013 | Petrisor .......................... | 725/76 |
| 2003/0204851 | A1* | 10/2003 | Powell .................. | H04H 20/20 725/63 |

(Continued)

FOREIGN PATENT DOCUMENTS

WO WO03073674 A2 9/2003

OTHER PUBLICATIONS

German Office Action for DE 102009045462 dated Aug. 17, 2010.
International Search Report and Written Opinion for PCT/EP2010/064530 dated Jan. 14, 2011.

*Primary Examiner* — Ricky Chin
(74) *Attorney, Agent, or Firm* — Jenkins, Wilson, Taylor & Hunt, P.A.

(57) ABSTRACT

The present invention provides a cabin management system for an aircraft or spacecraft, comprising: at least one first terminal, which acts as an interface for one or more passengers; at least one second terminal, which performs safety-related functions; and at least one means set up to provide and/or receive video data to/from the first terminal and safety-related data to/from the second terminal.

20 Claims, 1 Drawing Sheet

(56) References Cited

U.S. PATENT DOCUMENTS

| | | | |
|---|---|---|---|
| 2005/0034168 A1* | 2/2005 | Beveridge | H04H 20/69 725/129 |
| 2005/0159151 A1 | 7/2005 | Eckelt | |
| 2005/0278753 A1* | 12/2005 | Brady et al. | 725/76 |
| 2006/0095162 A1* | 5/2006 | Schafer, Jr. | B64D 11/0015 700/275 |
| 2006/0179457 A1* | 8/2006 | Brady et al. | 725/76 |
| 2006/0277589 A1* | 12/2006 | Margis | H04H 20/62 725/135 |
| 2007/0057121 A1* | 3/2007 | Callahan | H02G 3/32 244/118.5 |
| 2008/0312778 A1 | 12/2008 | Correa | |
| 2009/0007194 A1* | 1/2009 | Brady, Jr. | H04N 7/10 725/77 |
| 2009/0034540 A1* | 2/2009 | Law | H04L 12/462 370/400 |
| 2010/0142552 A1* | 6/2010 | Dietl | B64D 11/0015 370/464 |
| 2010/0144267 A1* | 6/2010 | Funderburk | B64D 11/0015 455/3.02 |
| 2011/0162015 A1* | 6/2011 | Holyoake | H04N 7/18 725/76 |
| 2013/0160060 A1* | 6/2013 | Margis | H04B 7/18508 725/75 |

\* cited by examiner

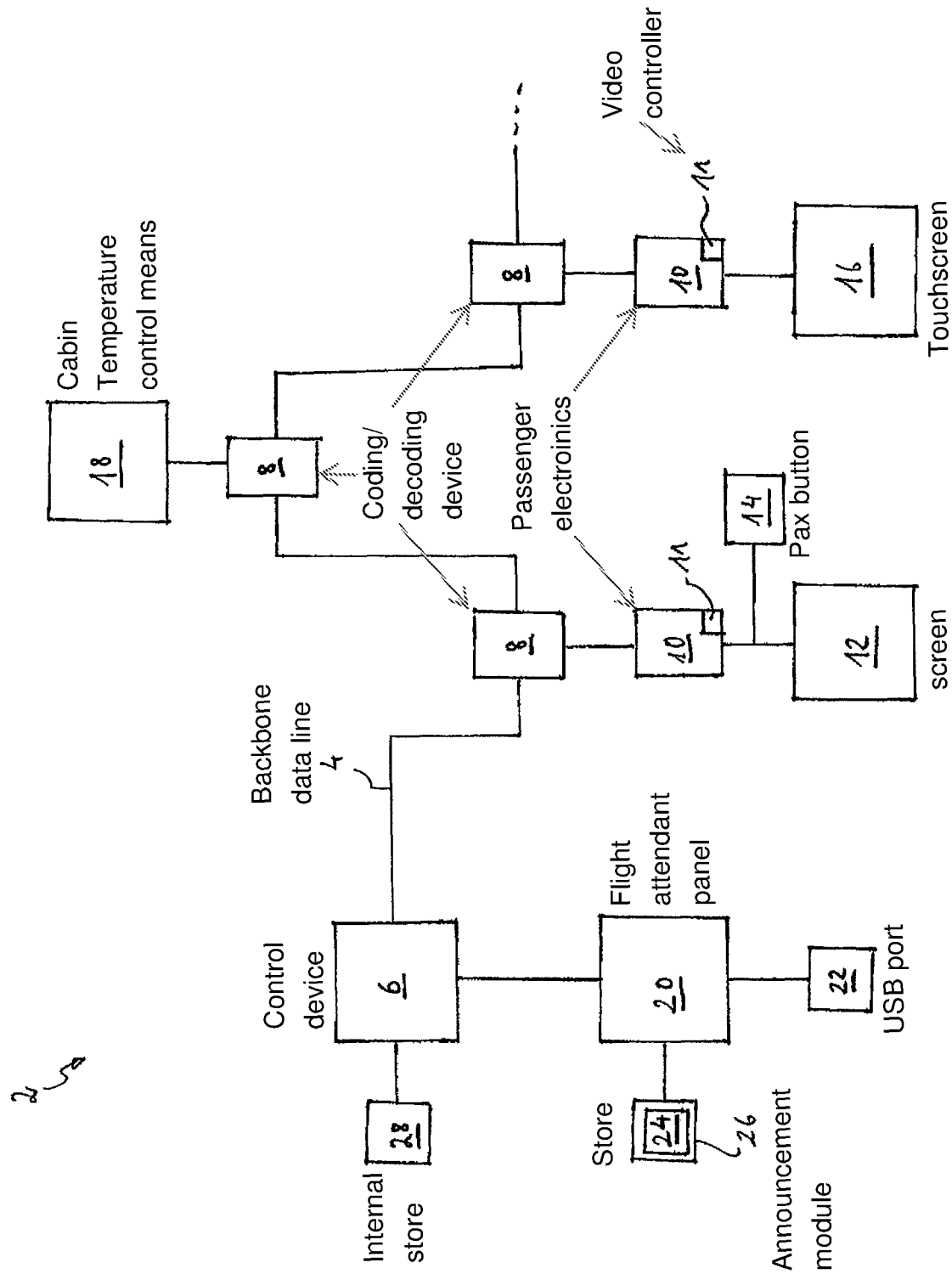

CABIN MANAGEMENT SYSTEM, AIRCRAFT OR SPACECRAFT HAVING A CABIN MANAGEMENT SYSTEM, AND METHOD

CROSS-REFERENCE TO RELATED APPLICATIONS

This application is a continuation of and claims priority to PCT/EP2010/064530 filed Sep. 30, 2010, which claims the benefit of and priority to U.S. Provisional Patent Application Ser. No. 61/249,377, filed Oct. 7, 2009, and German patent Application No 10 2009 045 462.4, filed Oct. 7, 2009, the entire disclosures of which are herein incorporated by reference.

FIELD OF THE INVENTION

The present invention relates to a cabin management system for an aircraft or spacecraft, to an aircraft or spacecraft comprising a cabin management system of this type, and to a method for operating a cabin management system.

BACKGROUND OF THE INVENTION

Although applicable to any aircraft or spacecraft, the present invention and the problem on which it is based will be explained in greater detail with reference to a passenger aircraft.

A cabin management system for passenger aircraft known internally to the Applicant, also known as a CIDS (cabin intercommunication data system), comprises inter alia a central control device, a bus, coding/decoding devices, passenger electronics, safety-related terminals and flight attendant panels. The data bus transmits safety-related data between the control device and the coding/decoding devices. The data bus typically has a low data rate of approximately 1 to 10 megabits per second, for example in A350 or A380 aircraft. The coding/decoding devices transmit the data for example via the passenger electronics to the safety-related terminals and back again. These terminals are for example a cabin illumination system, a door lock display, an emergency signal display, a no-smoking display, a seatbelt display, etc. These terminals may be controlled by means of the flight attendant panel, for which purpose said panel is connected to the central control device as regards data. For example, the cabin illumination can be switched into on/off/dimmed states. A further safety-related terminal is for example the button, within a passenger's reach, by means of which a flight attendant can be called to the passenger (pax call). Pressing this button triggers a safety-related data stream, which is transmitted via the passenger electronics, the coding/decoding device, the data bus and the control device to the flight attendant panel, whereupon a message about the passenger's call is displayed on the screen of the flight attendant panel. The central control device confirms that said passenger's call has been received at the flight attendant panel, and switches an LED arranged in the button to yellow. For this purpose, safety-related data are transmitted from the flight attendant panel to the button.

The cabin management system has to be present in any aircraft, and for safety reasons, various components of this cabin management system have to be provided in a redundant manner, such as the central control device.

Moreover, aircraft increasingly comprise in-flight entertainment systems for providing the passengers with entertainment programmes. In-flight entertainment systems of this type conventionally comprise a data store, for example in the form or a tape, CD or hard drive, a data bus, and passenger terminals such as screens. Video data stored on the data store are transmitted to the passenger terminals, for displaying the video data, via the data bus, which has a high data rate of for example 100 megabits to 1 gigabit per second.

These two systems, namely the cabin management system and the in-flight entertainment system, are of a significant weight and require a considerable amount of space. The systems also have significant assembly and maintenance costs.

SUMMARY OF THE INVENTION

A cabin management system for an aircraft or spacecraft is provided with: at least one terminal, which acts as an interface for one or more passengers; at least one second terminal, which performs safety-related functions; and at least one means set up to provide and/or receive video data to/from the first terminal and safety-related data to/from the second terminal.

Furthermore, an aircraft or spacecraft comprising the cabin management system according to the invention is provided.

Furthermore, a method is provided for operating a cabin management system, in particular the cabin management system according to the invention, comprising the following steps: providing and/or receiving video data to/from a first terminal via at least one means; and providing and/or receiving safety-related data to/from a second terminal via the same means.

The idea behind the invention is that the management system can be adapted to carry out functions which were previously assigned to the separate in-flight entertainment system, i.e. according to the invention the in-flight entertainment system should be integrated into the management system. For this purpose, one or more means of the management system are used to provide and/or receive both video data and safety-relevant data to/from a first terminal, which acts as an interface for one or more passengers, and to/from a second terminal, which performs safety-related functions. In this context, what is crucial is that the same means performs both functions, i.e. providing both the safety-related data and the video data.

This makes it possible to save on components by comparison with the known solution, thus reducing the weight, space requirements, assembly costs and maintenance costs.

Advantageous embodiments and developments of the invention are set out in the dependent claims.

In the present document, transmitting, providing or receiving data preferably includes direct transmission, provision or reception, as well as indirect, i.e. further devices or components may be interposed in the data stream.

In a further preferred development of the cabin management system according to the invention, the first and second terminal are the same or different devices. For example, the first and second terminal may be formed by one and the same screen. In this case, on the one hand video data for the passengers can be displayed on this screen. On the other hand, safety-related data can be shown on the screen, for example a request for passengers to put on their seatbelts or to refrain from smoking. It is equally possible for example to form the first terminal as a screen, on which video data are shown, and the second terminal as a separate display, for example in the overhead region, which indicates that seatbelts are to be put on or requests that passengers refrain from smoking.

In a preferred development of the management system according to the invention, the means is in the form of a backbone data line, which is set up to transmit the safety-related data and the video data at a data rate of preferably between 100 megabits per second and 1 gigabit per second. In this development, the data line is formed with a higher data rate than in the known solution. It is thus also possible to transmit both the video data and the safety-related data via this backbone data line.

In a further preferred development of the cabin management system, the first and/or second terminal comprises a screen, in particular a touchscreen. This development is advantageous if the terminal is to act as a device for the passenger to input commands. Thus, the touchscreen may for example have the functionality which was previously assigned to the button described at the outset for calling the flight attendant (pax call). This means that the previously provided button is not required.

In a further preferred development of the cabin management system according to the invention, passenger electronics are provided and are connected to the screen and the backbone data line as regards data, a video controller being integrated into the passenger electronics and being set up to provide the video data to the screen for display on said screen and/or for controlling said screen. Thus, instead of a separate video controller for displaying video data on the screen and controlling said screen, as in previously known in-flight entertainment systems, said video controller is integrated into the passenger electronics. This also results in saving on components.

In a further preferred development of the cabin management system, the passenger electronics are connected to the second terminal as regards data, the passenger electronics being set up to provide the safety-related data to the second terminal for display on said screen and/or for controlling said screen. Thus, the passenger electronics preferably control both the first and the second terminal and provide video data and safety-related data thereto. The passenger electronics thus perform a double function. For example, the second terminal may be a no-smoking display, which is formed separately from the first device, which is for example in the form of a screen.

In a further preferred development of the cabin management system according to the invention, the passenger electronics are set up to transmit user inputs from the first and/or the second terminal to the backbone data line. Thus, the passenger electronics make data communication possible not only to the first or second terminal, but also therefrom to the data line, and via said data line for example to a central control device for the backbone data line or to a flight attendant panel.

In a further preferred development of the cabin management system according to the invention, a store is provided for storing the video data. The known cabin management system is thus supplemented inter alia by a store for storing video data.

In a preferred development of the cabin management system according to the invention, the store is a component of an integrated preset announcement module and/or is provided in addition thereto. Integrated preset announcement modules are known, and conventionally comprise a store for storing audio announcements. These audio announcements are among the safety-relevant data, and are already provided in known cabin management systems. In this development, the announcement module is set up in such a way that it can also store the video data as well as the audio data. Additionally or alternatively, a separate store may also be provided for storing the video data, which is for example provided separately from the announcement module.

In a further preferred development of the cabin management system, the means comprise a control device, which controls the data flow on the backbone data line, the store being in the form of an internal store of this control device. The control device in known cabin management systems only has a small data store. In this development, said store is expanded and set up to be adapted for storing video data.

In a further preferred development of the cabin management system, a data interface, for example a USB port, is provided, and is set up to transmit video data to the store. This development makes it possible to transmit video data from external data carriers, for example a laptop, to the store. This may for example take place when the aircraft is on the ground, and new video data are therefore available and are thus brought into the aircraft via the laptop, for example. Alternatively, the data interface may for example be a data interface to the Internet.

In a further preferred development of the cabin management system, the means comprise at least one flight attendant panel, which is set up to control the first and second terminal. The flight attendant panel preferably comprises the data interface. In this development, the flight attendant panel is thus set up to transmit both video data and safety-related data.

In a further preferred development of the cabin management system, the second terminal is in the form of cabin illumination, a cabin and/or cockpit announcement device, a door lock display, an emergency signal display, a no-smoking display, a seatbelt display, a smoke alarm display, cabin temperature control means, or a water tank and/or waste tank monitoring device. The second terminal thus takes on safety-related functions.

The above-mentioned developments described for the cabin management system apply analogously to the method according to the invention.

BRIEF DESCRIPTION OF THE DRAWINGS

In the following, the invention will be described in greater detail on the basis of embodiments with reference to the accompanying figures.

In the FIGURE, data lines, which may be formed by a cable or wirelessly, are shown in dashes. Rectangles in the FIGURE represent components.

DETAILED DESCRIPTION OF THE INVENTION

The FIGURE shows a cabin management system 2 of an aircraft according to an embodiment of the present invention.

The cabin management system 2 comprises a backbone data line 4. The backbone data line 4 connects a central control device 6 of the cabin management system 2 to coding/decoding units 8. The backbone data line 4 preferably has a data rate in the range of approximately between 100 megabits and 1 gigabit per second. The backbone data line 4 may be in the form of an optical fibre.

Two of the coding/decoding units 8 are connected via passenger electronics 10 to first terminals 12, 16 and a second terminal 14 of the cabin management system 2. The terminals 12, 14 and 16 are a screen 12, a button 14 for calling cabin staff (referred to hereinafter as a pax button) and a touchscreen 16 respectively. The passenger electronics 10 in each case comprise a video controller 11 for controlling the screen 12 or the touchscreen 16. The terminals 12, 14 and 16 are for example provided within passengers' reach, and thus for example on the underside of overhead luggage compartments (not shown).

A third coding/decoding unit 8 is connected to a cabin temperature control means 18.

The coding/decoding units 8 are preferably interconnected in a fail-safe, short-circuited point-to-point topology.

The cabin management system 2 further comprises a flight attendant panel 20, which is connected to the control device 6. The flight attendant panel 20 comprises a data interface 22, which is in the form of a USB port. The flight attendant panel 20 is further connected to a store 24, for example a solid-state store, for video data.

The construction of the cabin management system 2 having been described above, the operation thereof will be briefly explained.

The flight attendant panel 20 has various functions. For example, the current cabin temperature may be displayed on a screen of the flight attendant panel 20. If this temperature is to be adjusted, a flight attendant can request, by way of input to the flight attendant panel 20, that the control device 6 control the cabin temperature control means 18 to adjust the cabin temperature to the desired temperature. For this purpose, corresponding safety-related data are transmitted to the cabin temperature control means 18 via the backbone data line 4 and the coding/decoding unit 8.

A passenger who wishes to summon a flight attendant may also actuate the pax button 14, whereupon safety-related data are transmitted therefrom, via the passenger electronics 10, the coding/decoding unit 8 and the control device 6, to the flight attendant panel 20, where the pax call is graphically displayed and if appropriate combined with a warning sound.

The above-described functions, i.e. pax call and temperature control in the cabin, are examples of safety-relevant functions which are performed by the cabin management system 2.

According to the invention, video data should also be provided and displayed to the passengers by means of the cabin management system 2. Preferably, the video data in the present document also comprise the associated synchronous audio data.

For this purpose, a flight attendant can bring video data from outside the aircraft into the cabin thereof, where they are connected to the USB port 22, when the aircraft is on the ground, for example by means of a laptop. Subsequently, the video data are transmitted to the store 24. In flight operation, a flight attendant can control the store 24, by way of input to the flight attendant panel 20, in such a way that said store transmits video data to the control device 6, which provides the video data, via the backbone line 4, the coding/decoding units 8, the passenger electronics 10 and the video controllers 11 thereof, to the screen 12 and the touchscreen 16, which subsequently display the video data to the passengers.

It is also possible, for example, to provide the functionality of the pax button 14 via the touchscreen 16. For this purpose, the passenger selects a correspondingly marked field on the touchscreen 16, triggering a pax call as described above. In this case, the touchscreen 16 sends safety-related data to the flight attendant panel 20.

The screen 12 and/the touchscreen 16 may also provide safety-related data, for example a no-smoking display, in addition to the video data. In this case, the screen 12 and the touchscreen 16 are first and second terminals within the meaning of the present document.

The components 8, 10, 11, 12, 14, 16 may be supplemented in various ways or may be of different configurations without departing from the concept of the present invention. In particular, the components 8, 10, 11, 12, 14, 16 may be adapted to the respective aircraft type and/or to the requirements of the aircraft operator.

According to the FIGURE, the store 24 is in the form of an additional store. However, it is equally possible for the store 24 to be formed as a component of an integrated preset announcement module 26 or as an internal store 28 of the control device 6.

Although the present invention has been described herein on the basis of preferred embodiments, it is not restricted thereto, but can be modified in various ways.

The invention claimed is:

1. A cabin management system with integrated in-flight entertainment system for an aircraft or spacecraft, comprising:
   a central control device for controlling the cabin management system;
   at least one flight attendant panel connected to the central control device;
   a plurality of coding/decoding units interconnected in a fail-safe point-to-point topology, wherein the plurality of coding/decoding units is also connected in series to the central control device by a backbone data line comprising a single transmission medium;
   at least one first terminal for an in-flight entertainment interface for one or more passengers connected to a coding/decoding unit via passenger electronics; and
   a plurality of second terminals for performing safety-related functions for one or more passengers, each second terminal being connected to a coding/decoding unit;
   wherein in-flight entertainment video data and safety-related data are transmitted from the central control device to the coding/decoding units on the backbone data line,
   wherein the second terminals are in the form of at least a water tank monitoring device and a waste tank monitoring device,
   wherein the second terminals include at least one or more cabin temperature controllers, the at least one flight attendant panel being configured to control at least the one or more cabin temperature controllers, wherein the cabin temperature controllers are configured to receive safety related data from the central control device via the backbone data line and at least one of the plurality of coding/decoding units.

2. The system of claim 1, wherein the first and second terminal are the same or different terminals.

3. The system of claim 1, wherein the backbone data line is configured to transmit the safety-related data and the in-flight entertainment video data at a data rate of between 100 megabits per second and 1 gigabit per second.

4. The system of claim 1, wherein the first and/or the second terminal comprises a screen.

5. The system of claim 4, wherein the screen comprises a touchscreen.

6. The system of claim 4, wherein the passenger electronics are connected to the screen and the coding/decoding units as regards data, a video controller being integrated into the passenger electronics and configured to provide the in-flight entertainment video data to the screen for display on the screen or for controlling the screen.

7. The system of claim 6, wherein the passenger electronics are configured to transmit user inputs from the first and/or the second terminal to the backbone data line.

8. The system of claim 1, further comprising a store for storing the in-flight entertainment video data.

9. The system of claim 8, wherein the store is a component of an integrated preset announcement module or is provided in addition thereto.

10. The system of claim 8, wherein the store is a component of an integrated preset announcement module and is provided in addition thereto.

11. The system of claim 8, wherein the store comprises an internal store of the control device.

12. The system of claim 8, further comprising one or more data interfaces, which is configured to transmit in-flight entertainment video data to the store.

13. The system of claim 12, wherein the one or more data interface comprises a USB port.

14. The system of claim 12, wherein each of the at least one flight attendant panel comprises one of the data interfaces.

15. The system of claim 1, wherein the second terminals further includes at least one of: a door lock display, an emergency signal display, a smoke alarm display, an attendant-call button, a cabin illumination, a no smoking display, a seatbelt display, and a cabin or cockpit announcement device.

16. The system of claim 4, wherein the passenger electronics are connected to the screen and the coding/decoding units as regards data, a video controller being integrated into the passenger electronics and being configured to provide the in-flight entertainment video data to the screen for display on the screen and for controlling the screen.

17. The system of claim 1, wherein the transmission medium is an optic fiber cable.

18. The system of claim 1, wherein at least one of the plurality of coding/decoding units is connected to a cabin temperature controller.

19. The system of claim 15, wherein the passenger electronics are connected to the second terminal as regards data, the passenger electronics being configured to provide the safety-related data to the second terminal for display on the screen and/or for controlling the screen.

20. An aircraft or spacecraft comprising a cabin management system with integrated in-flight entertainment system for the aircraft or spacecraft, comprising:
- a central control device for controlling the cabin management system;
- at least one flight attendant panel connected to the central control device;
- a plurality of coding/decoding units interconnected in a fail-safe point-to-point topology, wherein the plurality of coding/decoding units is also connected in series to the central control device by a backbone data line comprising a single transmission medium;
- at least one first terminal for an in-flight entertainment interface for one or more passengers connected to a coding/decoding unit via passenger electronics; and
- a plurality of second terminals for performing safety-related functions for one or more passengers, each second terminal being connected to a coding/decoding unit;
- wherein in-flight entertainment video data and safety-related data are transmitted from the central control device to the coding/decoding units the backbone data line,
- wherein the second terminals are in the form of at least a water tank monitoring device and a waste tank monitoring device,
- wherein the second terminals include at least one or more cabin temperature controllers, the at least one flight attendant panel being configured to control at least the one or more cabin temperature controllers, wherein the cabin temperature controllers are configured to receive safety related data from the central control device via the backbone data line and at least one of the plurality of coding/decoding units.

* * * * *